United States Patent [19]

Rollet et al.

[11] Patent Number: 5,388,785
[45] Date of Patent: Feb. 14, 1995

[54] SINGLE-ROTOR HELICOPTER HAVING A COMPOUND ANTI-TORQUE SYSTEM, AND A METHOD OF COUNTERING THE TORQUE INDUCED BY SAID SINGLE ROTOR

[75] Inventors: Philippe A. Rollet, Velaux; Paul G. Eglin, Aix en Provence, both of France

[73] Assignee: Societe Anonyme dite: Eurocopter France, Marignane Cedex, France

[21] Appl. No.: 34,503

[22] Filed: Mar. 19, 1993

[30] Foreign Application Priority Data

Apr. 14, 1992 [FR] France .................... 92 04566

[51] Int. Cl.$^6$ .............................. B64C 27/82
[52] U.S. Cl. ........................ 244/17.19; 244/7 R
[58] Field of Search ............. 244/17.11, 17.13, 17.19, 244/17.21, 7 R, 6, 7 A, 7 B

[56] References Cited

U.S. PATENT DOCUMENTS

| | | |
|---|---|---|
| 2,581,396 | 1/1952 | Erickson . |
| 4,947,334 | 8/1990 | Massey et al. ............ 244/17.13 |
| 5,131,604 | 7/1992 | Yoerkie et al. ........... 244/17.19 |
| 5,214,596 | 5/1993 | Muller ..................... 244/17.13 |

FOREIGN PATENT DOCUMENTS

| | | |
|---|---|---|
| 2167249 | 8/1973 | France . |
| 2338845 | 8/1977 | France . |
| 1144116 | 2/1963 | Germany . |

OTHER PUBLICATIONS

EP 000524044, Allongue Jan. 20, 1993.

*Primary Examiner*—Galen L. Barefoot
*Attorney, Agent, or Firm*—Marshall, O'Toole, Gerstein, Murray & Borun

[57] ABSTRACT

A helicopter comprising: a single main rotor for forwards motion and for support; and an anti-torque system comprising: an auxiliary, anti-torque rotor rotated from the engine means of said main rotor and exerting controllable anti-torque lateral thrust; and at least one steering airfoil that is controllable in steering and that generates anti-torque transverse lift. According to the invention, the helicopter includes automatic swivel control means for automatically controlling the swivel angle of said steering airfoil as a function of the collective pitch angle of said main rotor and of the forward speed of said helicopter.

20 Claims, 4 Drawing Sheets

SINGLE-ROTOR HELICOPTER HAVING A COMPOUND ANTI-TORQUE SYSTEM, AND A METHOD OF COUNTERING THE TORQUE INDUCED BY SAID SINGLE ROTOR

The present invention relates to helicopters having a single main rotor for forward motion and for support purposes, and a compound anti-torque device comprising an anti-torque rotor associated with at least one steerable airfoil such as a rudder or such as a fin that is steerable as a whole. The invention also relates to a method of optimally countering the torque induced on the helicopter by said main rotor. The present invention applies particularly, but not exclusively, to helicopters in which the anti-torque rotor is of the faired type.

BACKGROUND OF THE INVENTION

In a helicopter provided with a single main rotor for forward motion and support purposes, it is known that the fuselage tends to rotate in the direction opposite to the direction of rotation of the said main rotor, in reaction to the torque exerted thereby. It is also known that to combat the reaction torque to which the fuselage is subjected, it is common practice to provide an auxiliary anti-torque rotor suitable for generating transverse thrust and rotated from the same driving source as the main rotor. Thus, the auxiliary, anti-torque rotor absorbs a fraction of the power available from said driving source.

As a result, to improve helicopter performance, it is advantageous for the auxiliary anti-torque rotor to be assisted in its function of providing lateral anti-torque stabilization for the fuselage.

For example, as described in U.S. Pat. No. 2, 818,224, it is possible during forwards flight to off-load said anti-torque rotor by using aerodynamic thrust acting on a fin provided at the tail of said helicopter. Such thrust is commonly obtained by giving the fin a curved profile and by setting it at a certain angle relative to the plane of symmetry of the fuselage. However, when defining a stationary fin, the thrust obtained in this way for a helicopter that is flying with no sideslip depends only on the dynamic pressure of the air on the fin, and is therefore not capable of being modulated. Since the anti-torque force to be exerted varies differently as a function of speed, and also as a function of other flight parameters, it results that optimum off-loading of the anti-torque rotor is possible in practice only for a single set of flying circumstances. It is conventional to optimize about level cruising flight, e.g. at the economic cruising speed. The setting of the fin is then selected so that the thrust exerted thereby off-loads the anti-torque rotor completely or largely at the selected cruising speed. As soon as flight conditions (horizontal speed, vertical speed) or the configuration of the aircraft (mass, external loading) change, then the initial adjustment of the fin is no longer optimum and a certain loss of performance appears. In addition, in downwards autorotation flight, thrust from the fin is superfluous (the torque to be countered from the main rotor is substantially zero), and needs to be balanced by negative thrust provided by the anti-torque rotor. This negative thrust represents a loss of performance and significantly reduces the remaining control range available for controlling the helicopter in yaw.

To avoid the drawbacks and the limitations that appear on using such a stationary off-loading fin, it is possible to implement a rudder airfoil that is steerable, as described in U.S. Pat. No. 2,369,652, for example. Such a rudder airfoil is manually controlled and a gyroscopic system is provided for controlling the gases of the main rotor engine so as to control the power delivered by the engine to maintain torque balance and prevent variations in engine power having effects that are too quick to be tracked by the necessary. readjustments of the anti-torque means.

It may be observed that the anti-torque system of the latter patent suffers from a particularly severe drawback in that it subordinates control of the main rotor to anti-torque control. In addition, it is complex since it makes use of a gyroscope system.

OBJECT AND BRIEF SUMMARY OF THE INVENTION

An object of the present invention is to remedy the above drawbacks.

To this end, the present invention provides a helicopter comprising:
  a single main rotor for forwards motion and for support; and
  an anti-torque system comprising:
    an auxiliary, anti-torque rotor rotated from the engine means of said main rotor and exerting controllable anti-torque lateral thrust; and
    at least one steering airfoil that is controllable in steering and that generates anti-torque transverse lift;
  wherein the helicopter includes automatic swivel control means for automatically controlling the swivel angle of said steering airfoil as a function of the collective pitch angle of said main rotor and of the forward speed of said helicopter.

The present invention is based on the fact that, for a given forward speed, the collective pitch angle of said main rotor is representative of the torque exerted by said main rotor, and thus of the reaction torque on the fuselage that needs to be countered by said anti-torque system, while the forward speed is representative of the lateral lift provided by said steering airfoil. The collective pitch angle and the forward speed thus appear to be parameters that are highly representative for balancing said helicopter in yaw.

According to an advantageous feature of the present invention:
  in a preparatory stage, a plurality of groups of three values are determined and stored, each group comprising a value for the forward speed of said helicopter, a value of the collective pitch angle, and a value of the swivel angle of said steering airfoil, for which groups the lateral thrust provided by said auxiliary anti-torque rotor is at least substantially zero; and
  in flight, the forward speed of said helicopter and the collective pitch angle are measured and a swivel angle is applied to said steering airfoil, which angle has a value that is at least approximately equal to the corresponding value in one of said three groups of values, in which the stored values of the forward speed and of the collective pitch angle are at least approximately equal to the corresponding measured values.

Preferably, during said preparatory stage, said groups of three values are determined on the basis of variations at constant swivel angle for said steering airfoil in the lateral thrust of said auxiliary anti-torque rotor as a function of said forward speed and on the basis of variations of said collective pitch angle as a function of said forward speed.

To make use of the information obtained in this way, it is possible that, with a plurality of said groups of three values, a table is formed having two entries and one exit, said entries being respectively a value of forward speed and a value of collective pitch angle, whereas the exit is a value for the swivel angle of said steering airfoil.

However, and preferably, on the basis of said plurality of said groups of three values, a mathematical model is established giving the swivel angle of said steering airfoil as a function of the forward speed of the helicopter and of the collective pitch angle of said main rotor.

The mathematical equation representative of said model may be a polynomial, in which each term includes the product of a power of said forward speed multiplied by a power of said collective pitch angle.

In order to simplify calculation, said mathematical model is represented graphically in a graph whose axes respectively represent said forward speed and said swivel angle of said steering airfoil, by means of a family of curves, each of which corresponds to a value of the collective pitch angle, and each of said curves is approximated over ranges of forward speed values by straight line segments. The swivel angle can then be a linear function of the collective pitch angle and of the speed of advance.

Said automatic swivel angle control means for controlling said steering airfoil may be independent of control means for controlling the anti-torque lateral thrust exerted by said auxiliary anti-torque rotor. However, it may be advantageous, on the contrary, for said automatic swivel angle control means for controlling said steering airfoil to be coupled with means for automatically controlling the anti-torque lateral thrust exerted by said auxiliary anti-torque rotor, so as to enable distribution of the overall anti-torque action to be optimized.

In an advantageous embodiment, said coupled means for automatically controlling swivelling of said steering airfoil and the anti-torque lateral thrust exerted by said auxiliary anti-torque rotor receive, in addition to the value of the collective pitch angle of the main rotor and the forward speed, the real pitch angle of the auxiliary anti-torque rotor, optionally plus other flight parameters such as the steering control, the angular yaw speed, the lateral load factor, the air density, the heading, the longitudinal trim, or the roll angle.

Thus, it is possible to actuate said steering airfoil to obtain zero or substantially zero thrust from the auxiliary anti-torque rotor while still ensuring yaw equilibrium for the helicopter.

Such a steering airfoil may be a rudder, e.g. mounted on a stationary fin provided at the tail of said helicopter. It may alternatively be constituted by a fin which is mounted to be steerable as a whole, i.e. the entire fin can be swivelled.

Naturally, the method of the invention can be implemented by controlling the swivel angle of a plurality of steering airfoils. For example, it is possible in accordance with the present invention to control a plurality of rudders and/or fins that swivel as a whole.

For example, possibly in addition to a rudder mounted on a fixed tail fin, the helicopter may include lateral fins suitable for off-loading said auxiliary anti-torque rotor, and said lateral fins may either be fitted with rudders or else they may be mounted so as to be steerable as a whole, said rudders and/or said lateral fins being controlled in a manner analogous to that described above.

In a variant, the helicopter may include two rear fins each of which may either be provided with a rudder that is controlled in the manner described above, or else may be mounted so as to be steerable as a whole and controlled in accordance with the invention.

BRIEF DESCRIPTION OF THE DRAWINGS

The figures of the accompanying drawings show clearly how the invention may be implemented. In the figures, identical references are given to items that are similar.

MORE DETAILED DESCRIPTION

Figure 1:
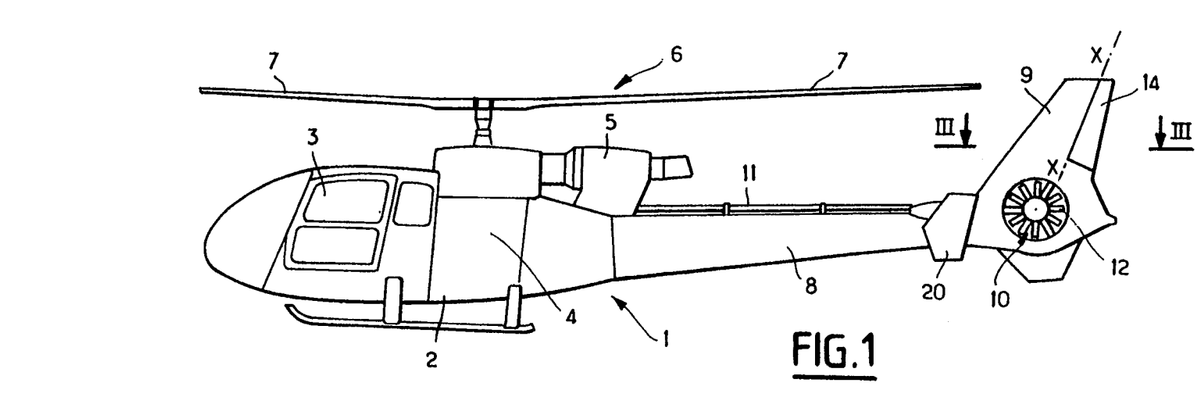
FIG. 1 is a diagrammatic side view of a helicopter in accordance with the invention.
Figure 2:
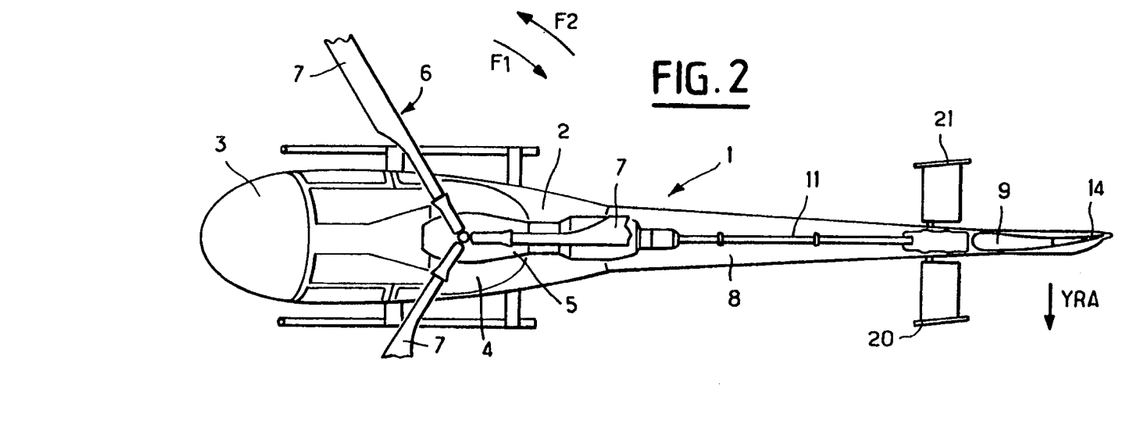
FIG. 2 is a plan view of the FIG. 1 helicopter.

The helicopter 1 shown diagrammatically in FIGS. 1 and 2 comprises a fuselage 2 whose front portion includes a cockpit 3. The intermediate portion 4 of said fuselage includes an engine unit 5 suitable for rotating a single main forwards motion and support rotor 6 made up of blades 7. The fuselage is extended rearwards by a tail 8, with the free end of the tail having a tail fin 9. The rear end of the tail 8, e.g. at the base of the fin 9, is also provided with a variable pitch anti-torque rotor 10 having blades 12 and rotated by the engine unit 5 by means of a rotary shaft 11. Said anti-torque rotor 10 is preferably faired, with the fairing being constituted by the base of the tail fin 9.

In conventional manner, if the main rotor 6 rotates in the direction of arrow F1 (FIG. 2), the helicopter is caused to rotate in the opposite direction F2 by reaction. The purpose of the anti-torque rotor 10 is to generate lateral thrust YRA countering the rotation of the fuselage in the direction F2, and of an amplitude that is controlled by the pitch of the blades 12.

Figure 3:
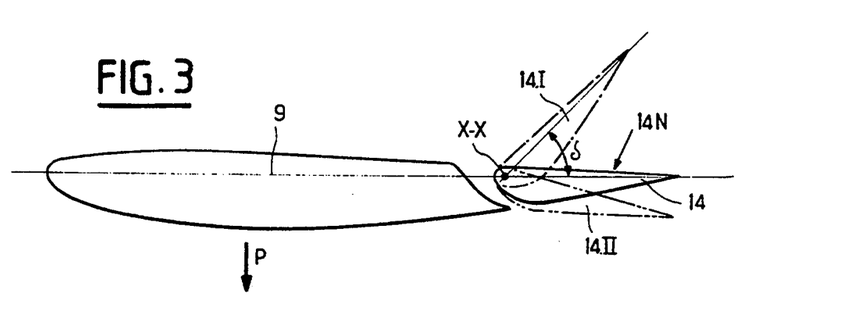
FIG. 3 is a section on a larger scale through the rear fin of said helicopter, on line III—III of FIG. 1.

In order to assist the anti-torque 10 in combating rotation of the fuselage in the direction F2, the fin 9 is shaped so as to generate lateral lift P, as shown in FIG. 3.

In addition, adjacent to the trailing edge of the fin 9, there is a rudder 14 which is steerable about an axis of rotation X—X. If the rudder 14 is swivelled in the direction F2 starting from its neutral position 14N so as to take up a position 14.I, then it increases the lateral lift P. In contrast, if the rudder is swivelled in the direction F1 to take up a position 14.II, the lateral lift P is decreased.

According to the invention, the swivel angle $\delta$ of the rudder 14 is a function of the collective pitch angle DTORP of the blades 7 of the main rotor 6 and of the forward speed V of the helicopter 1.

Figure 4:
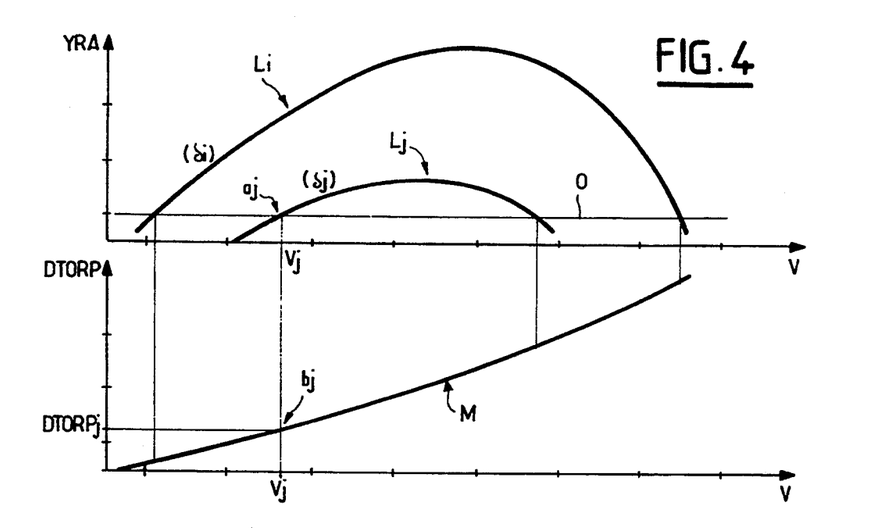
FIG. 4 is a diagram explaining the theory on which the present invention is based.

Two graphs are plotted one above the other in corresponding positions in FIG. 4. The first system has lateral thrust YRA of the anti-torque rotor 10 plotted up the ordinate as a function of the forward speed V of the helicopter 1 plotted along the abscissa. The second graph has the collective pitch angle DTORP of the main rotor 6 plotted up the ordinate likewise as a function of the forward speed V of the helicopter 1 plotted along the abscissa.

The following are plotted experimentally, by simulation or by calculation:

on the first graph, for each of a plurality of swivel angles δ of the rudder, a curve showing the variation in YRA as a function of V. Thus, for a value δi of δ, a particular curve Li is obtained from a family of curves, whereas for the value δj of δ, another particular curve Lj of said family of curves is obtained; and on the second graph, the curve M representing variation in the collective pitch angle DTORP as a function of the forward speed V.

Naturally, optimum use of the rudder 14 is obtained when the lateral thrust YRA provided by the anti-torque rotor 10 is zero. For a particular curve Lj, said optimum use corresponds to the point of intersection aj between said curve Lj and the straight line O, corresponding to YRA=0. The point aj corresponds to a value Vj of the speed V.

In addition, for each value Vj of the speed V, the curve M provides a corresponding value DTORPj of the pitch angle DTORP.

Thus, from the curves Lj and M, ir is possible to determine a triplet of values DTORPj, Vj, and δj for which the swivel angle of the rudder 14 is optimum.

Naturally, since a plurality of curves Li are used and not a single curve Lj, a plurality of such triplets are in fact determined.

It can thus be seen that because of this plurality of triplets and by measuring DTORP and V, it is possible to determine the optimum value of δ that corresponds to the measured values of DTORP and of V. By a process that is the inverse of that described above, the measured values of DTORPj and Vj determine a point bj on the curve M to which the point aj on the curve Lj corresponds, thereby giving the value δj for the swivel angle δ.

Figure 5:
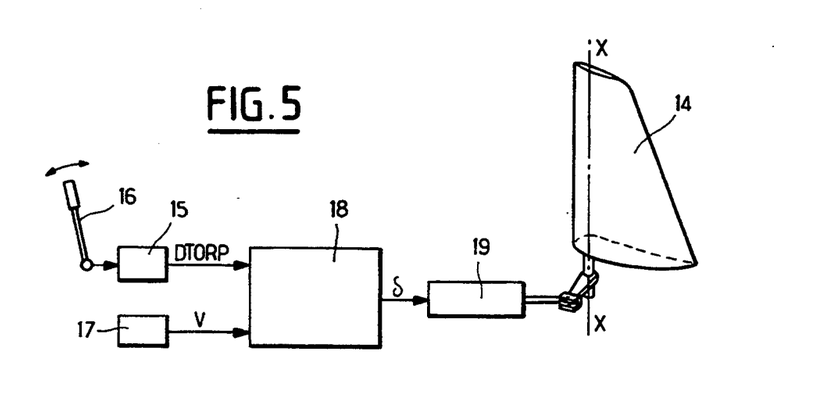
FIG. 5 is a block diagram showing a first embodiment of anti-torque control means in accordance with the present invention.

The device shown diagrammatically in FIG. 5 serves to control optimum swivelling of the rudder 14 about the axis X—X. This device comprises a position sensor 15 associated with the control lever 16 that the pilot of the helicopter uses for controlling the collective pitch, and also a sensor 17 for sensing the forward speed V of the helicopter. The collective pitch angle DTORP delivered by the sensor 15 and the speed V delivered by the sensor 17 are applied to a calculator 18 which uses these two input measurements to deliver the swivel value δ to be applied to the rudder 14. The value δ is applied to an actuator 19 that controls swivelling of the rudder 14 about the axis X—X. The pitch of the blades 12 of the anti-torque rotor 10 can thus be adjusted so that the thrust YRA is zero.

The calculator. 18 may include a table that causes each measured pair of values DTORPi and Vi to correspond to an optimum value δi, as described above. Under such circumstances, the main function of the calculator 18 then consists, on receiving a pair of measured values DTORPi and Vi, in looking up the corresponding value δ in said table and in applying it to the actuator 19.

However, in a variant, it is possible from the plurality of triplets DTORPi, Vi, and δi, to determine a theoretical function of the two variables DTORP and V that is representative of the swivel angle δ, such that δ=H(DTORP, V).

In which case, for each measured pair of values DTORPi and Vi, the calculator 18 calculates the corresponding value δi by applying the equation δi=H(DTORPi, Vi).

Experiment and calculation have shown that the theoretical function. H is advantageously in the form of a polynomial of the type:

$$\delta = H(DTORP, V) = k1.DTORP^{n1}.V^{m1} + k2.DTORP^{n2}.V^{m2} + \ldots + kp.DTORP^{np}.V^{mp}$$

in which:

$k1, k2, \ldots, kp$ are p numerical coefficients, each associated with a respective one of the p terms of the function H;

$n1, n2, \ldots, np$ are integer or fractional exponents associated with the variable DTORP in respective ones of said p terms; and $m1, m2, \ldots, mp$ are integer or fractional exponents associated with the variable V in respective ones of said p terms.

Figure 6:
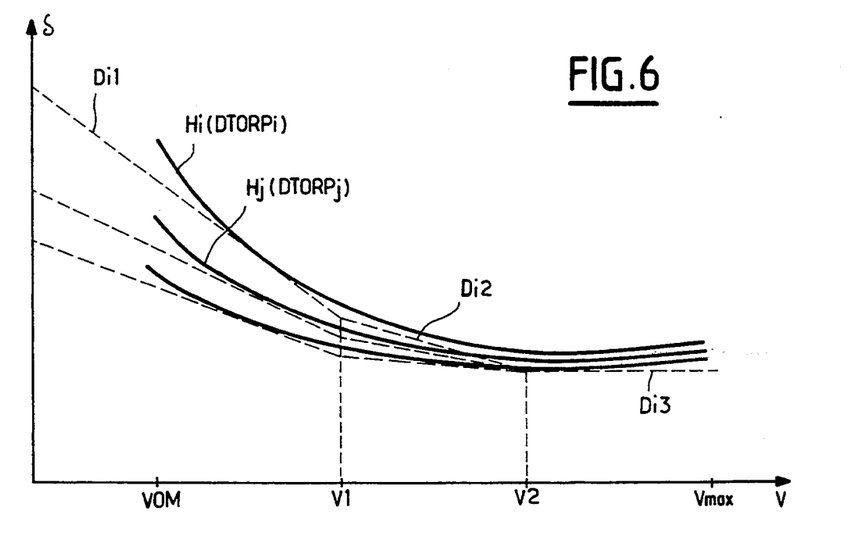
FIG. 6 is a graph showing how the rudder should be swivelled as a function of the forward speed and as a function of the collective pitch angle.

The function $H(DTORP, V)$ may be represented graphically by the family of curves Hi in FIG. 6.

In this figure, each curve Hi represents change in swivel angle δ as a function of forward speed V for a given value DTORPi of the collective pitch DTORP.

The family of curves Hi thus represents the relationship $H(DTORP, V)$ that enables the lateral thrust YRA provided by the anti-torque rotor 10 to be zero.

This relationship is relatively complicated, however it can be simplified. Experience shows, in particular for a faired tail rotor, that there exists a zone around YRA having the value zero in which the total power WTT consumed by the anti-torque rotor 10 is practically constant (said total power WTT including the power actually drawn by the anti-torque rotor 10 from the engine unit 5 to generate the lateral thrust YRA plus the power required for overcoming the drag of said anti-torque rotor 10 and also supplied by the engine unit 5), said zone tending to become larger at high speed V. It therefore results that there is no need to cancel the lateral thrust YRA from the anti-torque rotor 10 completely, and that it suffices to come as close as possible to said zone. If the rudder 14 is swivelled beyond the swivel angle that enables said zone to be reached, not only would no power be saved from the anti-torque rotor 10, but power would be lost because of the additional drag due to the rudder 14.

Consequently, the curves Hi can be approximated by straight line segments (liner functions) over speed ranges. FIG. 6 shows that each curve Hi is approximated by a straight line segment Di1 between the optimum climb speed VOM and a value V1 of V, by a straight line segment Di2 between the value V1 and a second value V2, and by a straight line segment Di3 between the value V2 and the maximum level speed Vmax.

In this simplified case, the function representative of δ in each of the ranges VOM-V1, V1-V2, and V2-Vmax is thus a linear function of DTORP and of V, of the type $$\delta = A.DTORP + B.V$$

where A and B are constant coefficients.

The swivel amplitude δ in the positive direction (position 14.I) may be about 30° to 45°, and in the negative direction (position 14.II) may be about −10° to −15°. The external swivel amplitudes are limited by abutments (not shown). Naturally, the actuator 19 may be electrical or hydraulic.

Thus:

in level flight of the helicopter 1 at speeds V lying in the range minimum power speed (VOM) and maximum level speed (Vmax), the rudder 14 can provide nearly all of the anti-torque force that is required and the tail rotor 10 can operate at practically zero thrust YRA, thus minimizing the total power required in flight throughout this range of speeds; it can be shown that the power consumed by the drag due to the rudder 14 is much less than the power that would be required for obtaining the same equilibrium solely by adjusting the thrust YRA from the tail rotor;

in climbing flight:
at high horizontal speed V, the effect of the rudder 14 (in a position 14.I) can be sufficiently effective to continue to provide substantially total off-loading of the tail rotor 10 for all of the vertical speeds possible with the installed engine unit;
for horizontal speeds V close to the optimum climb speed VOM, the rudder 14 rapidly reaches its abutment in the positive direction once the vertical speed becomes positive; it therefore provides partial off-loading only and the relative amount of off-loading it provides becomes smaller and smaller as the vertical speed increases; nevertheless, the effect of the rudder 14 on the total power required while climbing remains advantageous, thus providing a significant increase in vertical speed for a given amount of power which may be converted into an increase in the mass that can be lifted when the critical condition is the climb rate on an engine; and in downward flight and in autorotation, the automatic drop in lift from the fin due to the rudder (in a position 14.II) avoids the need to generate negative thrust YRA using the anti-torque rotor 10; this increases the control margin available on the rudder control bar and, to a certain extent, also makes it possible to limit the negative pitch range of the anti-torque rotor; the fact that there is no need to generate negative thrust from the tail rotor during autorotation increases the gliding fineness of the helicopter during this stage of flight.

It can thus be seen that by virtue of the invention, performance increases are obtained, in particular with respect to:

the vertical upwards speed at the optimum climb speed VOM;
the maximum speed in level flight Vmax; and
the mass that can be lifted.

With respect to the measured forward speed V, it is advantageous to use indicated air speed since indicated air speed is generally measured on board helicopters. True air speed VTAS, namely the real speed of the helicopter relative to the air, is generally not measured. Nevertheless, it is known that true air speed VTAS and indicated speed are related to each other via the density of the air.

The rudder 14 may be of any known type. It may be a plane flap or a slotted flap. A slotted flap is advantageous for obtaining high degrees of anti-torque rotor off-loading in climbing flight at the optimum speed VOM.

As shown in FIGS. 1 and 2, the helicopter 1 may include lateral fins 20 and 21 that provide an additional aerodynamic contribution that helps off-load the anti-torque rotor 10. Each of the lateral fins 20 and 21 may be provided adjacent to its trailing edge with a rudder similar to the rudder 14 and swivelled in similar manner. In a variant, each of the said lateral fins 20 and 21 may be capable of being swivelled as a whole, and control of such swivelling may be as described above.

When lateral fins 20 and 21 are provided, it may optionally be possible to omit providing the abovedescribed central tail fin 9.

Figure 7:
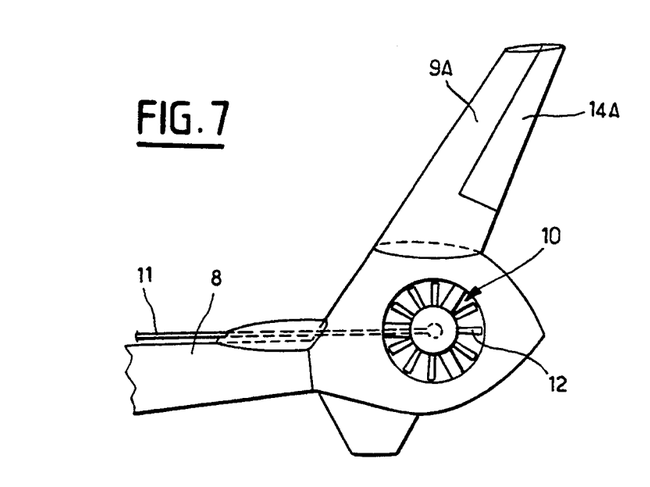
FIGS. 7 and 8 are respectively a side view and a plan view of the tail end of a helicopter in accordance with the present invention and having two tail fins.
Figure 8:
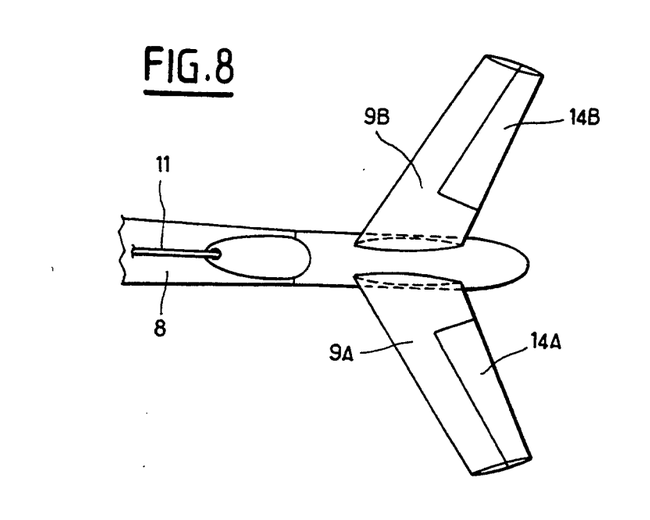

In the variant embodiment shown in FIGS. 7 and 8, the vertical tail fin 9 shown in FIGS. 1 and 2 is replaced by two sloping fins 9A and 9B. As can be seen, each sloping fin 9A and 9B is provided along its trailing edge with a rudder 14A or 14B which is swivelled in similar manner to that described above for the rudder 14. In a variant, each sloping fin 9A and 9B could be mounted so as to be swivelled as a whole, with swivelling being controlled in accordance with the present invention.

It may be observed that the apparatus of FIG. 5 is particularly simple, but that it is incapable of taking account of parameters that cannot be measured or that are difficult to measure, such as the mass of the helicopter 1, the density of the air, or the sideslip of said helicopter. Unfortunately, these parameters have an influence on the collective pitch angle DTORP. As a result, the apparatus of FIG. 5 runs the risk of providing an effect that is not always optimum.

Figure 9:
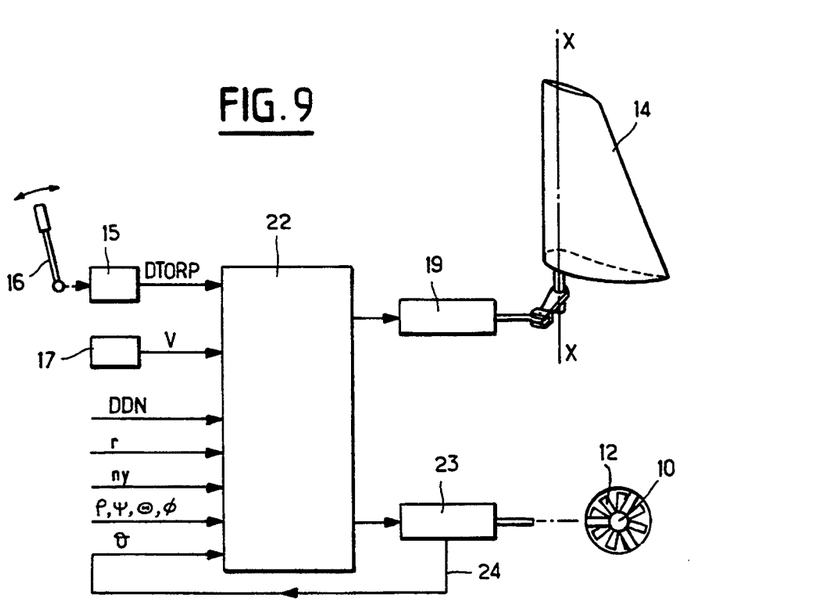
FIG. 9 is a block diagram of a second embodiment of anti-torque control means in accordance with the present invention.

To improve the apparatus of FIG. 5, the apparatus of FIG. 9 includes a calculator 22 for controlling the yaw of the helicopter 1 instead of the calculator 18 for swivelling the rudder 14.

In addition to the collective pitch DTORP and the forward speed V, the calculator 22 also receives:

the steering control DDN from the rudder control bar made available to the pilot, via a rudder bar position sensor (not shown);

the angular yaw rate r, optionally together with the angular roll rate and the angular pitch rate;

the lateral load factor ny; and the air density $\rho$, the heading $\Psi$, longitudinal trim $\Theta$, and roll angle $\phi$.

These various input data items are measured and calculated in conventional and known manner on board helicopters.

In addition to controlling the actuator 19 of the rudder 14, the yaw control calculator 22 also controls an actuator 23 which in turn controls the pitch $\theta$ of the blades (and thus the thrust YRA) of the anti-torque rotor 10. A feedback connection 24 injects the pitch $\theta$ of the blades 12 into the calculator 22 like the other items of information DTORP, V, DDN, r, ny, $\rho$, $\Psi$, $\Theta$ and $\phi$.

Thus, the apparatus of FIG. 9 operates in a closed loop and makes it possible to eliminate the influence of the unmeasurable parameters mentioned above. The apparatus of FIG. 9 makes it possible to optimize the distribution of the anti-torque action between the rudder 14 and the anti-torque rotor 10 by bringing the pitch $\theta$ of the blades 12 to a reference value and simultaneously conserving lateral equilibrium of the helicopter 1. On the basis of a measurement of the real pitch $\theta$ as applied to the anti-torque rotor 10, this apparatus actuates the rudder 14 using an auto-trim type law until yaw equilibrium is obtained with the pitch of the anti-torque rotor delivering zero or substantially zero thrust. It may be observed that with a faired type of anti-torque rotor, this pitch is practically independent of speed.

As a function of the (mechanical or electrical) architecture of the flight controls and of the presence (or absence) of an automatic pilot system, the practical structure of the apparatuses shown in FIGS. 5 and 9 may take up numerous different forms.

In addition, by an appropriate choice of actuators 19 and 23, it is possible to obtain control apparatuses that respond quickly or slowly. Quick response apparatuses are capable of improving the yaw stability and the maneuverability of the helicopter 1.

From the above, it will readily be understood that the rudder 14 in FIGS. 5 and 6 could be replaced by a fin 9, 20, or 21 having no separate rudder and capable of being swivelled as a whole. Similarly, although FIGS. 5 and 9 show one rudder 14 only, it is naturally possible for the control means 18 and 22 to control a plurality of rudders 14 simultaneously (or a plurality of fins, each capable of being swivelled as a whole).

We claim:

1. A helicopter comprising:
    a single main rotor for forwards motion and for support; and
    an anti-torque system comprising:
    an auxiliary, anti-torque rotor rotated from the engine means of said main rotor and exerting controllable anti-torque lateral thrust; and
    at least one steering airfoil that is controllable in steering and that generates anti-torque transverse lift;
    wherein the helicopter includes automatic swivel control means for automatically controlling the swivel angle of said steering airfoil as a function of the collective pitch angle of said main rotor and of the forward speed of said helicopter.

2. A helicopter according to claim 1, wherein said automatic swivel angle control means for controlling said steering airfoil are independent of control means for controlling the anti-torque lateral thrust exerted by said auxiliary anti-torque rotor.

3. A helicopter according to claim 1, wherein said automatic swivel angle control means for controlling said steering airfoil are coupled with means for automatically controlling the anti-torque lateral thrust exerted by said auxiliary anti-torque rotor.

4. A helicopter according to claim 3, wherein said coupled control means receive the real pitch angle of the auxiliary anti-torque rotor.

5. A helicopter according to claim 4, wherein said coupled means for automatically controlling swivelling of said steering airfoil and the anti-torque lateral thrust exerted by said auxiliary anti-torque rotor receive, in addition to the value of the collective pitch angle of the main rotor, the forward speed, and the real pitch angle of the auxiliary anti-torque rotor, at least one flight parameter selected from the group consisting of steering control, angular yaw speed, lateral load factor, air density, heading, longitudinal trim, and roll angle.

6. A helicopter according to claim 1, wherein said steering airfoil is a rudder.

7. A helicopter according to claim 1, wherein steering airfoil is a fin that can be swivelled as a whole.

8. A helicopter according to claim 1, including a plurality of steering airfoils controlled by said automatic swivel angle control means.

9. A helicopter according to claim 1, including lateral fins suitable for off-loading said auxiliary anti-torque rotor.

10. A helicopter according to claim 9, wherein said lateral fins are fitted with rudders, controlled by said automatic swivel angle control means.

11. A helicopter according to claim 9, wherein each of said lateral fins is mounted so as to be capable of being swivelled as a whole, said fins being controlled by said automatic swivel angle control means.

12. A helicopter according to claim 1, including two tail fins each of which is provided with a rudder controlled by said automatic swivel angle control means.

13. A helicopter according to claim 1, including two rear fins each of which is suitable for being swivelled as a whole, and is controlled by said automatic swivel angle control means.

14. A method of countering the torque exerted by a single main rotor for forward motion and support purposes on a helicopter that includes an anti-torque system comprising:
    an auxiliary anti-torque rotor rotated by engine means for said main rotor and exerting controllable anti-torque lateral thrust; and
    at least one steering airfoil of controllable steering and suitable for generating anti-torque transverse lift;
    said method comprising the steps of
    determining and storing a plurality of groups of three values in a preparatory stage, each group comprising a value for the forward speed of said helicopter, a value of the collective pitch angle, and a value of the swivel angle of said steering airfoil, for which groups the lateral thrust provided by said auxiliary anti-torque rotor is at least substantially zero; and
    measuring, in flight, the forward speed of said helicopter and the collective pitch angle and applying to said steering airfoil a swivel angle having a value that is at least approximately equal to the corresponding value in one of said three groups of values, in which the stored values of the forward speed and of the collective pitch angle are at least approximately equal to the corresponding measured values.

15. A method according to claim 14, wherein during said preparatory stage, said groups of Three values are determined on the basis of variations at constant swivel angle for said steering airfoil in the lateral thrust of said auxiliary anti-torque rotor as a function of said forward speed and on the basis of variations of said collective pitch angle as a function of said forward speed.

16. A method according to claim 14, wherein with a plurality of said groups of three values, a table is formed having two entries and one exit, said entries being respectively a value of forward speed and a value of collective pitch angle, whereas the exit is a value for the swivel angle of said steering airfoil.

17. A method according to claim 14, wherein on the basis of said plurality of said groups of three values, a mathematical model is established giving the swivel angle of said steering airfoil as a function of the forward speed of the helicopter and of the collective pitch angle of said main rotor.

18. A method according to claim 17, wherein the mathematical equation representative of said model is a polynomial, in which each term includes the product of a power of said forward speed multiplied by a power of said collective pitch angle.

19. A method according to claim 18, wherein said mathematical model is represented graphically in a graph whose axes respectively represent said forward speed and said swivel angle of said steering airfoil, by means of a family of curves, each of which corresponds to a value of the collective pitch angle, and wherein each of said curves is approximated over ranges of forward speed values by straight line segments.

20. A method according to claim 19, wherein over each of said forward speed value ranges, the swivel angle of said steering airfoil is a linear function of the collective pitch angle and of the forward speed.

* * * * *

UNITED STATES PATENT AND TRADEMARK OFFICE
CERTIFICATE OF CORRECTION

PATENT NO. : 5,388,785
DATED : February 14, 1995
INVENTOR(S) : Philippe Alain Rollet, et al.

It is certified that error appears in the above-identified patent and that said Letters Patent is hereby corrected as shown below:

Column 2, line 8, "necessary.readjustments" should be --necessary readjustments--.

Column 5, line 31, "ir is" should be --it is--.

Column 5, line 61, "calculator.18" should be --calculator 18--.

Column 5, line 67, "value $\delta$" should be --value $\delta i$--.

Column 6, line 11, "function.H" should be --function H--.

Column 7, line 4, "about --10˚" should be --about -10˚--.

Column 8, lines 13-14, "abovede-scribed" should be --above-described--.

Column 9, line 25, "for forwards" should be --for forward--.

Column 10, line 46, "groups of Three" should be --groups of three--.

Signed and Sealed this

Thirty-first Day of October 1995

Attest:

BRUCE LEHMAN

*Attesting Officer*  *Commissioner of Patents and Trademarks*